United States Patent Office 3,795,580
Patented Mar. 5, 1974

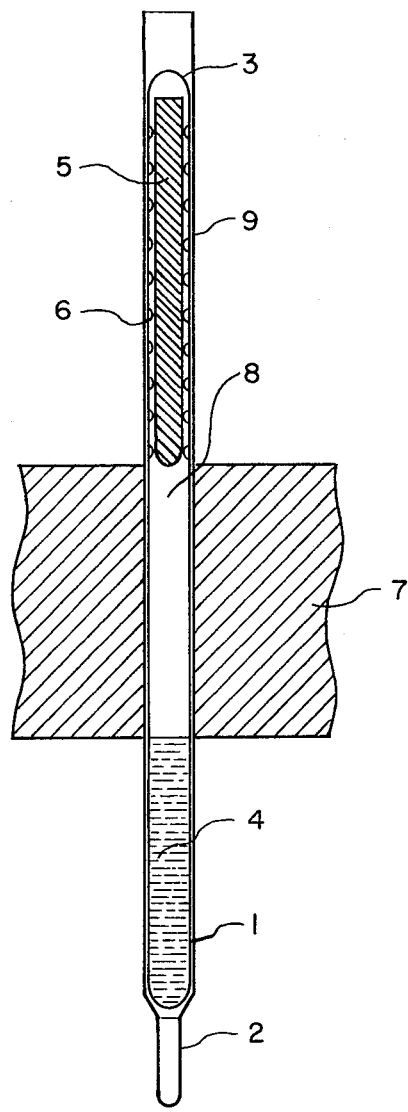

3,795,580
FUSE FOR NUCLEAR REACTOR
Dixon P. Schively, Richland, Wash., assignor to the United States of America as represented by the United States Atomic Energy Commission
Filed Oct. 19, 1972, Ser. No. 298,984
Int. Cl. G21c 7/22
U.S. Cl. 176—86 M                     5 Claims

ABSTRACT OF THE DISCLOSURE

A fuse for nuclear reactor shutdown is provided which employs a fusible metal plug disposed within an elongated capsule at its upper extremity to upwardly displace, upon fusing at a preselected reactor excursion temperature, a liquid neutron absorber from the bottom portion of the capsule into the central portion which substantially corresponds to the core region of the reactor. The present fuse is placed within a core duct of the reactor.

A method for shutting down a nuclear reactor is also provided wherein liquid neutron absorbing poison is introduced into the reactor core region by volume displacement.

BACKGROUND OF THE INVENTION

This invention was made in the course of, or under a contract with the U.S. Atomic Energy Commission. It relates generally to nuclear reactor shutdown devices and methods for achieving reactor shutdown and more particularly to a fuse for reactor shutdown using a fusible plug and method for effecting reactor shutdown.

While nuclear reactors have control systems as an integral part which will function under a given signal to shut down the reactor, it has been the practice in the nuclear industry to provide each reactor with a reliable back-up system for automatic reactor shutdown in the unlikely event the usual reactor control system fails to function.

Heretofore numerous reactor shutdown devices have been made available to the nuclear technology wherein neutron poisons are added automatically to the reactor core at sustained over-temperature conditions to effect reactor shutdown. In a device described in U.S. Pat. 3,130,128 a neutron absorbing gas is admitted into the reactor core region upon fusing of a plug at a predetermined reactor temperature. Another device shown in U.S. Pat. 3,249,510 employs one or more control rods disposed above the reactor core region which fall into the core region upon the melting of a fusible member at an excessively high temperature. Additionally in U.S. Pat. 2,987,455 there is described a reactor safety control apparatus comprising an untriggered neutron absorbing material in the reactor which is adapted to be quickly dispersed within the reactor core by a trigger device such as a solder plug.

It is an object of this invention to provide a fuse for a nuclear reactor and a method for achieving automatic shutdown of the reactor at sustained over-temperature conditions.

SUMMARY OF THE INVENTION

In accordance with this invention a fuse for nuclear reactor shutdown is provided and comprises an elongated capsule adapted to fit within a core duct of the reactor, said capsule having a bottom portion filled with a neutron absorber which is a liquid at the reactor inlet temperature, a central portion corresponding substantially to the core region of the reactor and being filled with a gas atmospheric pressure at the reactor inlet temperature, and an upper portion filled with a fusible metal plug of a preselected volume, the plug being solid at the normal reactor outlet temperature and fusible at a preselected reactor excursion temperature. Reactor shutdown by the principal method of this invention is achieved by introducing a liquid neutron absorber into the reactor core by volume displacement.

In one embodiment the fusible metal plug may comprise an aluminum-silicon alloy, or stainless steel having a jacket of aluminum-silicon alloy disposed thereabout, and the elongated capsule a stainless steel cylinder lined with Cb-1-Zr. The liquid neutron absorber may comprise $^6$Li and the gas, helium at 15 p.s.i.a.

BRIEF DESCRIPTION OF THE DRAWINGS

The sole drawing in this case is a vertical section of the fuse device of this invention.

DESCRIPTION OF THE PREFERRED EMBODIMENT

The fuse provided by this invention may be incorporated in a nuclear reactor as an automatic backup system for shutdown of the chain reaction upon sustained overtemperature conditions providing that the core coolant inlet flow is upward at a temperature greater than melting point of lithium and leaves the core at a temperature less than the melting point of the fusible metal plug. Referring to the drawing there is provided an elongated core duct 1 which is of the same geometry as the regular reactor duct and is adapted to fit within an available fuel channel in the reactor. In one embodiment the core duct is of regular hexagonal cross section and has a necked-down terminal at lower end 2 for inserting in the grid plate of the reactor's core support structure. Suitable means (not shown), such as a grapple socket, is provided at the top end of duct 1 to facilitate inserting and removing the entire length of duct 1 from the reactor.

The fuse comprises an elongated capsule 3 which is adapted to slidably fit within core duct 1. The bottom portion of capsule 3 is below the reactor core region and is filled with a neutron absorber material 4 which is normally liquid at the reactor inlet temperature. $^6$Li, quite a strong neutron absorber ($^6$Li+$n$→$^3$H+$\alpha$) and having a melting point of approximately 356° F., is quite suitable as a liquid neutron absorber for reactors having operation inlet temperature ranges of 400° F. to 800° F. The upper portion of capsule 3 is above the reactor core region and is filled with fusible metal plug 5 which normally remains supported in this portion of capsule 3 until a sustained reactor excursion. In the preferred embodiment the fusible metal plug 5 is approximately 95 percent aluminum and 5 percent silicon, a commercially available alloy which starts to melt at about 1040° F. This temperature corresponds to a reasonable over-temperature limit for nuclear reactors operating at a core outlet temperature in the range of 900° F. to 1000° F. The fuse provided by the preferred embodiment is particularly adaptable to liquid metal fast breeder reactors because the first of these reactors will operate in the said inlet and outlet temperature ranges. For reactors operating with lower outlet temperatures a different alloy may be chosen so that metal plug 5 will melt at a corresponding over-temperature. For reactors operating in the outlet temperature range of 1000° F. to 1150° F., metal plug 5 may be made of pure aluminum which melts at about 1220° F.

Protrusions 6 may, for example, be cold-pressed into the capsule wall and into the fusible plug from the capsule exterior to a maximum internal height of ⅛ inch to support metal plug 5 and also to assure heat conduction in the solid.

As an alternative arrangement one embodiment comprises a stainless steel or nickel-base alloy plug provided with an aluminum jacket and upon melting of the jacket the volume displacement is provided by the stainless steel plug. Finally, the central portion of capsule 3 which substantially corresponds to the reactor core 7 is filled with a gas 8 at atmospheric pressure. Helium at about 15 p.s.i.a. is satisfactory for the vacant central portion of capsule 3.

The capsule 3 may comprise a 300 series stainless steel of about one-eighth inch thickness and be lined or unlined. In the drawing there is shown a Cb-1-Zr line 9 which is mechanically bonded to the capsule. The liner could also be sodium bonded to the capsule for good heat conductance.

It should be apparent to those skilled in the art that selection of the materials as well as the various quantities of materials needed will vary depending upon the type reactor, the space available and actual reactivity worth of the fuse in a particular position in the reactor. For example, for the preferred embodiment in the second row of an LMFBR type of reactor having a prototypic peak flux of $7 \times 10^{15}$ neutrons/cm.$^2$-sec., about 6 pounds of lithium absorber 4 (90 percent $^6$Li and 10 percent $^7$Li by weight) would produce a negative reactivity charge of almost 4 percent $\Delta k/k$ or more than enough strength to shut the reactor down from full power. About 30 pounds of aluminum would be required for fuse 5 to displace and mix with lithium absorber 4 to fill the central portion of capsule 3. It should be noted that where the fusible plug 5 is pure aluminum or aluminum-rich alloy, the plug will alloy at the interface with the displaced lithium absorber 4. This alloying will not reduce hte effectiveness of the displaced absorber 4.

In an alternative embodiment where plug 5 is stainless steel which is non-melting at the temperature of concern, it is important that the lithium absorber 4 be displaced to the center of the core-length portion of capsule 3 to attain its maximum shutdown strength. Thus, the non-melting plug should be about one-half the length of the fusible plug.

In operation of the preferred embodiment, the surface of the fusible metal 5 starts to melt with excessive reactor core outlet temperature, e.g., at 1200° F. in less than one second, in the region. If the sudden change to over-temperature persists, e.g., 1200° F. for as long as about 10 seconds, the melting alloy fuse then moves, rapidly downwardly into the bottom portion of capsule 3, displacing the less dense neutron absorber 4 upwardly into the core region. For regional outlet temperatures greater than 1040° F. but less than 1200° F., longer times for the same plug to melt would be required, and for temperatures greater than 1200° F., shorter times for plug fusion would be required. Thus, the correspondingly shorter times required for automatic reactor shutdown are associated with termination of the more severe over-temperature excursions.

Advantageously, reactor shutdown could be readily obtained with only one such fuse which, for example, could be placed in any central fuel channel. Thus, while many prior art reactor fuses require fissionable material to melt and run out of the core at higher temperatures, the present device provides for the automatic addition of a strong absorber to the core upon sustained over-temperature conditions.

As an alternative to upward displacement of absorber 4, the fusible metal plug 5 could be a lithium alloy such as Li-Al (10% Li, 90% Al by weight) which melts at about 1112° F. In this arrangement, the lithium absorber would fall into the active core region. This arrangement could be used where little or no volume was available below the core region. For higher outlet temperatures the binary alloy, lithium-antimony, could be used.

Removal of the capsule and replacement with a spare capsule would be relatively easy after each use. The fuse and absorber materials may be restored without reprocessing the capsule by virtue of the different melting points involved.

It should be understood by those skilled in the prior art that all matters contained in the hereinbefore description are illustrative only and that many modifications and variations may be made by others without departing from the scope of the invention. The present invention is to be limited only by the appended claims.

What is claimed is:

1. In a nuclear reactor having a core region, reactor ducts extending through said core region, said ducts being adapted to receive reactor fuel assemblies and reactor control rods, and means for passing reactor coolant upward through said reactor ducts whereby reactor inlet and outlet operating temperatures are established at the lower and upper ends of said reactor ducts respectively, a nuclear fuse for effecting reactor shutdown at sustained over-temperature reactor conditions comprising an elongated capsule adapted to slidably fit within one of said reactor core ducts and which is positioned therein, said capsule having a bottom portion filled with a neutron absorber which is liquid at said reactor inlet temperature, a central portion corresponding substantially to said core region, said central portion being filled with a gas at atmospheric pressure at said reactor inlet temperature, and an upper portion having means for retaining a fusible metal plug that melts at said sustained over-temperature, said retaining means shaped and positioned to allow for free movement of said fusible metal at said over-temperature, said fusible metal having a density greater than that of said neutron absorber, and having a sufficient and necessary volume of said fusible metal which at said over-temperature flows downwardly into the lower portion of said capsule to displace sufficient neutron absorber upwardly into said central portion of said capsule and effect reactor shutdown.

2. The nuclear reactor of claim 1 wherein said capsule comprises a stainless steel cylinder lined with Cb-I-Zr, said absorber is $^6$Li, said inlet temperature range is about 400° F. to 800° F., said gas is helium at a pressure of about 15 p.s.i.a., said fusible metal plug is an aluminum-silicon alloy, and said reactor outlet temperature is in the range of 900° F. to 1000° F.

3. The nuclear reactor of claim 2 wherein said aluminum-silicon alloy comprises 95% aluminum-5% silicon by weight percent.

4. The nuclear reactor of claim 1 wherein said fusible metal plug is supported within said capsule by a multiplicity of heat conduction protrusions cold-pressed into the capsule wall.

5. The nuclear reactor of claim 1 wherein said fusible metal plug comprises a material selected from stainless steel or nickel-base alloy having a jacket of an aluminum-silicon alloy disposed thereabout.

References Cited
UNITED STATES PATENTS 3,249,510   5/1966   Dohm, Jr., et al. _____ 176—22

FOREIGN PATENTS 916,326   1/1963   Great Britain _____ 176—86 L
627,784   9/1961   Canada _____ 176—86 L HARVEY E. BEHREND, Primary Examiner U.S. Cl. X.R.

176—Dig. 5